US011001666B2

(12) United States Patent
Albach et al.

(10) Patent No.: US 11,001,666 B2
(45) Date of Patent: May 11, 2021

(54) FLEXIBLE POLYURETHANE FOAMS BASED ON POLYOXYMETHYLENE-POLYOXYALKYLENE BLOCK COPOLYMERS

(71) Applicant: Covestro Intellectual Property GmbH & Co. KG, Leverkusen (DE)

(72) Inventors: Rolf Albach, Cologne (DE); Annika Stute, Cologne (DE); Markus Meuresch, Cologne (DE); Petra Venner, Leverkusen (DE)

(73) Assignee: Covestro Intellectual Property GmbH & Co. KG, Leverkusen (DE)

( * ) Notice: Subject to any disclaimer, the term of this patent is extended or adjusted under 35 U.S.C. 154(b) by 0 days.

(21) Appl. No.: 16/971,340

(22) PCT Filed: Feb. 25, 2019

(86) PCT No.: PCT/EP2019/054573
§ 371 (c)(1),
(2) Date: Aug. 20, 2020

(87) PCT Pub. No.: WO2019/166365
PCT Pub. Date: Sep. 6, 2019

(65) Prior Publication Data
US 2020/0392281 A1 Dec. 17, 2020

(30) Foreign Application Priority Data

Feb. 28, 2018 (EP) .................. 18159328

(51) Int. Cl.
| C08G 18/10 | (2006.01) |
| C08G 18/32 | (2006.01) |
| C08G 18/48 | (2006.01) |
| C08G 18/54 | (2006.01) |
| C08G 18/72 | (2006.01) |
| C08G 18/76 | (2006.01) |
| C08G 18/79 | (2006.01) |
| C08J 9/14 | (2006.01) |

(52) U.S. Cl.
CPC .......... *C08G 18/798* (2013.01); *C08G 18/10* (2013.01); *C08G 18/3206* (2013.01); *C08G 18/3275* (2013.01); *C08G 18/4841* (2013.01); *C08G 18/546* (2013.01); *C08G 18/725* (2013.01); *C08G 18/7671* (2013.01); *C08J 9/14* (2013.01); *C08G 2110/005* (2021.01); *C08G 2110/0008* (2021.01); *C08G 2110/0058* (2021.01); *C08G 2110/0083* (2021.01); *C08J 2201/022* (2013.01); *C08J 2203/10* (2013.01); *C08J 2203/182* (2013.01); *C08J 2205/06* (2013.01); *C08J 2375/08* (2013.01); *C08J 2471/02* (2013.01)

(58) Field of Classification Search
CPC ............... C08G 18/4841; C08G 18/546; C08J 2375/08; C08J 2471/02
See application file for complete search history.

(56) References Cited

U.S. PATENT DOCUMENTS

| 3,404,109 A | 10/1968 | Milgrom |
| 3,436,375 A | 4/1969 | McAndrew |
| 3,754,053 A * | 8/1973 | Kray et al. ............. C08G 65/06 525/398 |
| 3,829,505 A | 8/1974 | Herold |
| 3,941,849 A | 3/1976 | Herold |
| 4,247,654 A * | 1/1981 | Wagner .............. C08G 65/2606 521/158 |
| 4,355,188 A | 10/1982 | Herold et al. |
| 4,380,620 A | 4/1983 | Matsuzaki et al. |
| 4,721,818 A | 1/1988 | Harper et al. |
| 4,877,906 A | 10/1989 | Harper |
| 4,987,271 A | 1/1991 | Watabe et al. |
| 5,010,047 A | 4/1991 | Schuchardt |
| 5,099,075 A | 3/1992 | Katz et al. |
| 5,158,922 A | 10/1992 | Hinney et al. |
| 5,391,722 A | 2/1995 | Chandalia et al. |
| 5,470,813 A | 11/1995 | Le-Khac |
| 5,482,908 A | 1/1996 | Le-Khac |
| 5,536,883 A | 7/1996 | Le-Khac |

(Continued)

FOREIGN PATENT DOCUMENTS

| DE | 2639083 A1 | 3/1978 |
| EP | 0406440 A1 | 1/1991 |

(Continued)

OTHER PUBLICATIONS

International Search Report, PCT/EP2019/054573, dated May 13, 2019, Authorized officer: Sandra Lanz.
Bull. Chem. Soc. J., 1994, 67, 2560-2566.
M. Haubs et al., 2012, Polyoxymethylenes, Ullmann's Encyclopedia of Industrial Chemistry.
G. Reuss et al., 2012, Formaldehyde, Ullmann's Encyclopedia of Industrial Chemistry.

*Primary Examiner* — Melissa A Rioja

(74) *Attorney, Agent, or Firm* — Donald R. Palladino; Jed C. Benson

(57) ABSTRACT

The present invention relates to a method for producing flexible polyurethane foams based on polyoxymethylene-polyoxyalkylene block copolymers. The invention also relates to the use of the flexible polyurethane foams thus produced and their use for producing furniture upholstery, textile inlays, mattresses, automobile seats, headrests, armrests, sponges, foam sheets for use in automobile parts such as roof linings, door panel upholstery, seat covers and technical components. The invention finally relates to a two-component system for producing flexible polyurethane foams.

19 Claims, No Drawings

(56) References Cited

U.S. PATENT DOCUMENTS

| | | | |
|---|---|---|---|
| 5,545,601 A | 8/1996 | Le-Khac | |
| 5,627,120 A | 5/1997 | Le-Khac | |
| 5,637,673 A | 6/1997 | Le-Khac | |
| 5,712,216 A | 1/1998 | Le-Khac et al. | |
| 5,714,428 A | 2/1998 | Le-Khac | |
| 5,789,626 A | 8/1998 | Le-Khac | |
| 6,018,017 A | 1/2000 | Le-Khac | |
| 7,008,900 B1 | 3/2006 | Hofmann et al. | |
| 9,534,090 B2 * | 1/2017 | Muller | C08G 2/30 |
| 9,790,328 B2 * | 10/2017 | Mueller | C08G 64/183 |
| 10,093,772 B2 | 10/2018 | Peckermann et al. | |
| 2014/0066535 A1 * | 3/2014 | Jacobs | C08G 18/12 |
| | | | 521/159 |
| 2017/0044341 A1 * | 2/2017 | Klesczewski | C08K 5/134 |
| 2017/0081463 A1 * | 3/2017 | Wamprecht | C08G 18/0895 |
| 2017/0096526 A1 * | 4/2017 | Peckermann | C08G 18/72 |

FOREIGN PATENT DOCUMENTS

| | | |
|---|---|---|
| JP | 2928823 B2 | 8/1999 |
| WO | 2004096746 A1 | 11/2004 |
| WO | 2015155084 A1 | 10/2015 |
| WO | 2015155094 A1 | 10/2015 |

* cited by examiner

FLEXIBLE POLYURETHANE FOAMS BASED ON POLYOXYMETHYLENE-POLYOXYALKYLENE BLOCK COPOLYMERS

CROSS-REFERENCE TO RELATED APPLICATION

This application is a national stage application under 35 U.S.C. § 371 of PCT/EP2019/054573, filed Feb. 25, 2019, which claims the benefit of European Application No. 18159328, filed Feb. 28, 2018, each of which is incorporated herein by reference.

FIELD

The present invention relates to a process for producing flexible polyurethane foams based on polyoxymethylene-polyoxyalkylene block copolymers. The invention further relates to the use of the flexible polyurethane foams obtainable by the process for producing furniture cushioning, textile inserts, mattresses, automobile seats, headrests, armrests, sponges and foam sheets for use in automobile components such as roof liners, door trim, seat cushions and component parts. Further, the invention relates to a two-component system for producing flexible polyurethane foams.

BACKGROUND

There is a need in the field of flexible polyurethane foams to produce more sustainable flexible polyurethane foams that are employable in automotive interiors. To be suitable for use in automotive interiors the foams require a good flame resistance and further may exhibit only a certain emission of volatile hydrocarbons (VOC) (standard FMVSS 302).

The inventors of the present invention have therefore sought to find a composition in which $C_2$- and $C_3$-units are replaceable by readily available C1-units.

WO 2004/096746 A1 experimentally describes isocyanate-reactive diols having OH numbers of 685 to 868 mg KOH/g based on polyoxymethylene (POM) and the document generally states that these could be suitable for producing prepolymers and flexible foams. However, a specific composition or a working example were not described.

SUMMARY

The present invention accordingly has for its object to provide a flexible polyurethane foam based on polyoxymethylene which exhibits good flame resistance and low emissions of VOC.

This object is achieved in accordance with the invention by a process for producing flexible polyurethane foams as claimed in claim 1 or 2.

DETAILED DESCRIPTION

It has now been found by the inventors of the present invention that, surprisingly, foams based on a POM-based polyether having an OH number of less than 56 mg KOH/g exhibit more advantageous characteristics over those based on a POM-based polyether having an OH number of 59 mg KOH/g although the latter have POM contents that are 3-4% higher. It has further been found that, surprisingly, the prepolymers according to the invention have a better viscosity.

In the present invention the proportions of polyoxymethylene units are determined via a GPC analysis coupled with an NMR analysis.

The aspects described for the components A1 to A5, A11 to A15 and B, B1, B2 may be applied to all embodiments. If for example a preferred embodiment of A1 is described then this is described in combination with the process for production and the two-component system.

The two-component systems according to the invention contain at least one catalyst. This may be added to the component A or B or may be added immediately before or during the mixing of the components A and B.

The invention especially relates to the following embodiments:

1. Process for producing flexible polyurethane foams preferably having a content of 5 to 150 g/kg of polyoxymethylene by reaction of a component A containing or consisting of A1 5 to 85 parts by weight, preferably 30 to 75 parts by weight, of at least one polyoxymethylene-polyoxyalkylene block copolymer having a hydroxyl number according to DIN EN ISO 4629-1:2016-12 of 5 mg KOH/g to 56 mg KOH/g, preferably 35 to 50, more preferably 38 to 48, mg KOH/g, wherein the two polyoxyalkylene blocks are terminal;

A2 0 to 95 parts by weight, preferably 15 to 95 parts by weight, more preferably 25 to 70 parts by weight, of at least one compound having 2 to 6 Zerewitinoff-active H atoms selected from the group of polyether polyols, polyester polyols, polyether ester polyols, polycarbonate polyols and/or polyacrylate polyols, preferably having a hydroxyl number according to DIN EN ISO 4629-1:2016-12 of 26 to 56 mg KOH/g;

A3 0.1 to 25 parts by weight, preferably 2 to 5 parts by weight, based on the sum of the parts by weight of the components A1 and A2 of water and/or physical blowing agents, A4 0 to 10 parts by weight, preferably 0.15 to 1.5 parts by weight, based on the sum of the parts by weight of the components A1 and A2, of at least one compound which has at least 2 Zerewitinoff-active H atoms and is distinct from A2, wherein the compound is preferably a crosslinker, more preferably selected from diethanolamine and glycerol or mixtures thereof;

A5 0 to 10 parts by weight, preferably 0.1 to 5 parts by weight, based on the sum of the parts by weight of the components A1 and A2, of auxiliary and additive substances, preferably selected from foam stabilizers, antioxidants, flame retardants, colorants and mixtures thereof;

with a component B containing or consisting of

B1 at least one di- and/or polyisocyanate having an average NCO functionality of 2.0 to 2.6, preferably 2.0 to 2.3;

wherein the reaction of the component A with the component B is performed in the presence of a catalyst and at an isocyanate index of 50 to 130, preferably 60 to 110, more preferably 70 to 90, and wherein all reported parts by weight of the components A1 to A5 are normalized such that the parts by weight of A1+A2 in the composition sum to 100 parts by weight.

2. Process for producing flexible polyurethane foams preferably having a content of 5 to 150 g/kg of polyoxymethylene by reaction of a component A containing or consisting of
A11 0 to 85 parts by weight, preferably 30 to 75 parts by weight, of at least one polyoxymethylene-polyoxyalkylene block copolymer preferably having a hydroxyl number according to DIN EN ISO 4629-1:2016-12 of 5 mg KOH/g to 56 mg KOH/g, more preferably 35 to 50, yet more preferably 38 to 48, mg KOH/g, wherein the two polyoxyalkylene blocks are terminal;
A12 0 to 100 parts by weight, preferably 15 to 100 parts by weight, more preferably 25 to 70 parts by weight, of at least one compound having 2 to 6 Zerewitinoff-active H atoms selected from the group of polyether polyols, polyester polyols, polyether ester polyols, polycarbonate polyols and/or polyacrylate polyols, preferably having a hydroxyl number according to DIN EN ISO 4629-1:2016-12 of 26 to 56 mg KOH/g;
A13 0.1 to 25 parts by weight, preferably 2 to 5 parts by weight, based on the sum of the parts by weight of the components A11 and A12 of water and/or physical blowing agents,
A14 0 to 10 parts by weight, preferably 0.15 to 1.5 parts by weight, based on the sum of the parts by weight of the components A11 and A12, of at least one compound which has at least 2 Zerewitinoff-active H atoms and is distinct from A2, wherein the compound is preferably a crosslinker, more preferably selected from diethanolamine and glycerol or mixtures thereof;
A15 0 to 10 parts by weight, preferably 0.1 to 5 parts by weight, based on the sum of the parts by weight of the components A11 and A12, of auxiliary and additive substances, preferably selected from foam stabilizers, antioxidants, flame retardants, colorants and mixtures thereof; with a component B containing or consisting of
B2 at least one prepolymer having an NCO content of 18-40% by weight of NCO, preferably 23.5-29.5% by weight of NCO, and obtained by reaction of
A1 5 to 18 parts by weight, preferably 10 to 15 parts by weight, of at least one polyoxymethylene-polyoxyalkylene block copolymer having a hydroxyl number according to DIN EN ISO 4629-1:2016-12 of 5 mg KOH/g to 56 mg KOH/g, preferably 28 to 50, more preferably 37 to 48 mg KOH/g, wherein the two polyoxyalkylene blocks are terminal;
A2 optionally further isocyanate-reactive or inert components containing no polyoxymethylene
with
B1 at least one di- and/or polyisocyanate having an average NCO functionality of 2.0 to 2.6, optionally in the presence of a catalyst, wherein the parts by weight of B1 are based on the sum of the parts by weight of A1 and A2 which are normalized to 100 parts by weight;
wherein the reaction of the component A with the component B is performed in the presence of a catalyst and at an isocyanate index of 50 to 130, preferably 60 to 110, more preferably 70 to 90, and wherein all reported parts by weight of the components A11 to A15 are normalized such that the parts by weight of A11+A12 in the composition sum to 100 parts by weight.

3. Process according to either of the preceding embodiments, characterized in that
The polyoxymethylene block of the polyoxymethylene-polyoxyalkylene block copolymer A1 and/or A11 has a weight-average molecular weight of 62 to 30 000 g/mol, preferably 242 to 3000 g/mol, more preferably 400 to 1500 g/mol, measured by gel permeation chromatography using polystyrene standards.

4. Process according to any of the preceding embodiments, characterized in that
the polyoxymethylene-polyoxyalkylene block copolymer A1 and/or A11 has the following formula (I):

$$HO\text{-}(alkO)_x\text{—}(CH_2O)_n\text{-}(alkO)_y\text{—}OH \qquad (I),$$

wherein
alkO is a structural unit which independently in each structural unit is derived from ethylene oxide, propylene oxide, butylene oxide or styrene oxide;
x is 2 to 100, preferably 3 to 60, more preferably 4 to 20;
y is 2 to 100, preferably 3 to 60, more preferably 4 to 20; and
n=5 to 100, preferably 10 to 50, more preferably 11 to 25; particularly preferably x=y.

5. Process according to any of the preceding embodiments, characterized in that A2 or A12 is a polypropylene oxide-polyethylene oxide block copolymer having an average functionality between 2.7 and 6, having a hydroxyl number according to DIN EN ISO 4629-1:2016-12 of 26 mg KOH/g to 56 mg KOH/g and a ratio of propylene oxide to ethylene oxide of 0.1 to 9:1.

6. Process according to any of the preceding aspects, characterized in that at least one di- and/or polyisocyanate B1 derives from MDI or TDI or mixtures thereof.

7. Process according to any of the preceding embodiments, characterized in that the catalyst is a catalyst that reacts with isocyanate to afford urethanes, ureas, allophanates or biurets, preference being given to catalysts that may be incorporated into the polyurethane via a hydroxyl group or via a primary or secondary amino function.

8. Flexible polyurethane foam obtainable by a process according to any of embodiments 1 to 8.

10. Flexible polyurethane foam according to embodiment 9, characterized in that it has an apparent density of 0.02 to 0.8 kg/dm$^3$, preferably 0.04 to 0.14 kg/dm$^3$, measured according to DIN ISO 845:2009-10.

11. Flexible polyurethane foam according to embodiment 9 or 10, characterized in that it meets the requirements of guideline 95/28/EC and the standard FMVSS 302 in respect of horizontal burning rate.

12. Use of the flexible polyurethane foam according to any of embodiments 9 to 11 for producing furniture cushioning, textile inserts, mattresses, automobile seats, headrests, armrests, sponges and foam sheets for use in automobile components such as roof liners, door trim, seat cushions and component parts.

13. Two-component system for producing flexible polyurethane foams from a component A containing or consisting of
A1 5 to 85 parts by weight, preferably 30 to 75 parts by weight, of at least one polyoxymethylene-polyoxyalkylene block copolymer having a hydroxyl number according to DIN EN ISO 4629-1:2016-12 of 5 mg KOH/g to 56 mg KOH/g, preferably 35 to 50, more preferably 38 to 48, mg KOH/g, wherein the two polyoxyalkylene blocks are terminal;

A2 0 to 95 parts by weight, preferably 15 to 95 parts by weight, more preferably 25 to 70 parts by weight, of at least one compound having 2 to 6 Zerewitinoff-active H atoms selected from the group of polyether polyols, polyester polyols, polyether ester polyols, polycarbonate polyols and/or polyacrylate polyols, preferably having a hydroxyl number according to DIN EN ISO 4629-1:2016-12 of 26 to 56 mg KOH/g;

A3 0.1 to 25 parts by weight, preferably 2 to 5 parts by weight, based on the sum of the parts by weight of the components A1 and A2 of water and/or physical blowing agents, A4 0 to 10 parts by weight, preferably 0.15 to 1.5 parts by weight, based on the sum of the parts by weight of the components A1 and A2, of at least one compound which has at least 2 Zerewitinoff-active H atoms and is distinct from A2, wherein the compound is preferably a crosslinker, more preferably selected from diethanolamine and glycerol or mixtures thereof;

A5 0 to 10 parts by weight, preferably 0.1 to 5 parts by weight, based on the sum of the parts by weight of the components A1 and A2, of auxiliary and additive substances, preferably selected from foam stabilizers, antioxidants, flame retardants, colorants and mixtures thereof;

and a component B containing or consisting of

B1 at least one di- and/or polyisocyanate having an average NCO functionality of 2.0 to 2.6, preferably 2.0 to 2.3;

and at least one catalyst, wherein the component A and the component B are present in a ratio of an isocyanate index of 50 to 130, preferably 60 to 110, more preferably 70 to 90, and wherein all reported parts by weight of the components A1 to A5 are normalized such that the parts by weight of A1+A2 in the composition sum to 100 parts by weight.

14. Two-component system for producing flexible polyurethane foams from a component A containing or consisting of A11 0 to 85 parts by weight, preferably 30 to 75 parts by weight, of at least one polyoxymethylene-polyoxyalkylene block copolymer preferably having a hydroxyl number according to DIN EN ISO 4629-1:2016-12 of 5 mg KOH/g to 56 mg KOH/g, more preferably 35 to 50, yet more preferably 38 to 48, mg KOH/g, wherein the two polyoxyalkylene blocks are terminal;

A12 0 to 100 parts by weight, preferably 15 to 100 parts by weight, more preferably 25 to 70 parts by weight, of at least one compound having 2 to 6 Zerewitinoff-active H atoms selected from the group of polyether polyols, polyester polyols, polyether ester polyols, polycarbonate polyols and/or polyacrylate polyols, preferably having a hydroxyl number according to DIN EN ISO 4629-1:2016-12 of 26 to 56 mg KOH/g;

A13 0.1 to 25 parts by weight, preferably 2 to 5 parts by weight, based on the sum of the parts by weight of the components A11 and A12 of water and/or physical blowing agents;

A14 0 to 10 parts by weight, preferably 0.15 to 1.5 parts by weight, based on the sum of the parts by weight of the components A11 and A12, of at least one compound which has at least 2 Zerewitinoff-active H atoms and is distinct from A2, wherein the compound is preferably a crosslinker, more preferably selected from diethanolamine and glycerol or mixtures thereof;

A15 0 to 10 parts by weight, preferably 0.1 to 5 parts by weight, based on the sum of the parts by weight of the components A11 and A12, of auxiliary and additive substances, preferably selected from foam stabilizers, antioxidants, flame retardants, colorants and mixtures thereof; with a component B containing or consisting of B2 at least one prepolymer having an NCO content of 18-40% by weight of NCO, preferably 23.5-29.5% by weight of NCO, and obtainable by reaction of A1 5 to 18 parts by weight, preferably 10 to 15 parts by weight, of at least one polyoxymethylene-polyoxyalkylene block copolymer having a hydroxyl number according to DIN EN ISO 4629-1:2016-12 of 5 mg KOH/g to 56 mg KOH/g, preferably 28 to 50, more preferably 37 to 48 mg KOH/g, wherein the two polyoxyalkylene blocks are terminal;

A2 optionally further isocyanate-reactive or inert components containing no polyoxymethylene;

B1 at least one di- and/or polyisocyanate having an average NCO functionality of at least 2.0 to 2.6, optionally obtainable in the presence of a catalyst, wherein the parts by weight of B1 are based on the sum of the parts by weight of A1 and A2 which are normalized to 100 parts by weight;

and at least one catalyst, wherein the component A and the component B are present in a ratio of an isocyanate index of 50 to 130, preferably 60 to 110, more preferably 70 to 90, and wherein all reported parts by weight of the components A11 to A15 are normalized such that the parts by weight of A11+A12 in the composition sum to 100 parts by weight.

In preferred embodiments no polyoxymethylene-polyoxyalkylene block copolymer having a hydroxyl number according to DIN EN ISO 4629-1:2016-12 of more than 56 mg KOH/g is present.

The isocyanate component B1 may especially comprise an aliphatic or aromatic di- or polyisocyanate. Examples are butylene 1,4-diisocyanate, pentane 1,5-diisocyanate, hexamethylene 1,6-diisocyanate (HDI) or the dimers, trimers, pentamers, heptamers or nonamers thereof or mixtures thereof, isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (polymeric MDI), 1,3- and/or 1,4-bis(2-isocyanatoprop-2-yl)benzene (TMXDI), 1,3-bis(isocyanatomethyl)benzene (XDI), and alkyl 2,6-diisocyanatohexanoates (lysine diisocyanates) having $C_1$ to $C_6$-alkyl groups. TDI and/or MDI are preferred.

In addition to the abovementioned polyisocyanates, it is also possible to use proportions of modified diisocyanates having a uretdione, isocyanurate, urethane, carbodiimide, uretonimine, allophanate, biuret, amide, iminooxadiazinedione and/or oxadiazinetrione structure and also unmodified polyisocyanate having more than 2 NCO groups per molecule, for example 4-isocyanatomethyl-1,8-octane diisocyanate (nonane triisocyanate) or triphenylmethane 4,4',4"-triisocyanate.

The production of polyoxymethylene-polyoxyalkylene block copolymer is to those skilled in the art for example from WO 2004/096746 A1 and EP 14163744.

The polyoxyalkylene block in the polyoxymethylene-polyoxyalkylene block copolymer is preferably derived from ethylene oxide, propylene oxide, butylene oxide and/or styrene oxide.

With regard to the formaldehyde in the production of the polyoxymethylene-polyoxyalkylene block copolymer it may be noted that formaldehyde may be employed in the gaseous state, optionally as a mixture with inert gases, for example nitrogen or argon, or as a mixture with gaseous, supercritical or liquid carbon dioxide, or as formaldehyde solution. Formaldehyde solutions may be aqueous formaldehyde solutions having a formaldehyde content between 1% by weight and 37% by weight which may optionally contain up to 15% by weight of methanol as a stabilizer. It is alternatively possible to use solutions of formaldehyde in polar organic solvents, for example methanol or higher mono- or polyhydric alcohols, 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another, with water and/or with other solvents. The presence of further substances in solution is likewise included. It is preferable to employ mixtures of gaseous formaldehyde with argon or carbon dioxide. Likewise preferred is the use of solutions of formaldehyde in aprotic polar organic solvents, for example 1,4-dioxane, acetonitrile, N,N-dimethylformamide (DMF), N,N-dimethylacetamide, dimethyl sulfoxide (DMSO), cyclic carbonates, e.g. ethylene carbonate or propylene carbonate, N-methylpyrrolidone (NMP), sulfolane, tetramethylurea, N,N'-dimethylethyleneurea or mixtures thereof with one another and/or other solvents.

Formaldehyde may alternatively be generated in situ from a suitable formaldehyde source. Employable formaldehyde sources include substances containing chemically bound formaldehyde, typically in the form of oxymethylene groups, and capable of releasing formaldehyde under suitable conditions. Suitable conditions for the release may include, for example, elevated temperatures and/or the use of catalysts and/or the presence of acids, bases or other reagents which lead to the release of monomeric formaldehyde. Preferred formaldehyde sources are 1,3,5-trioxane, paraformaldehyde, polyoxymethylene, dimethyl acetal, 1,3-dioxolane, 1,3-dioxane and/or 1,3-dioxepane, particular preference being given to 1,3,5-trioxane and paraformaldehyde.

Also employable are oligomeric formaldehyde precursors containing chemically bound formaldehyde, typically in the form of oxymethylene groups, and capable of releasing formaldehyde under suitable conditions. Suitable conditions for the release may include, for example, elevated temperatures and/or the use of catalysts and/or the presence of acids, bases or other reagents which lead to the release of monomeric formaldehyde. Preferred formaldehyde sources are 1,3,5-trioxane, dimethyl acetal, 1,3-dioxolane, 1,3-dioxane and/or 1,3-dioxepane.

Polyoxymethylene-polyoxyalkylene block copolymers may alternatively be produced by catalytic addition of alkylene oxides and optionally further comonomers onto polymeric formaldehyde starter compounds in the presence of a double metal cyanide (DMC) catalyst as described in EP 14163744.

Suitable polymeric formaldehyde starter compounds in principle include oligomeric and polymeric forms of formaldehyde having at least one terminal hydroxyl group for reaction with the alkylene oxides and any further comonomers. The term "terminal hydroxyl group" is to be understood as meaning in particular a terminal hemiacetal functionality which is formed as a structural feature by the polymerization of formaldehyde. For example, the starter compounds may be oligomers and polymers of formaldehyde of general formula HO—$(CH_2O)_n$—H where n is an integer $\geq 2$ and where polymeric formaldehyde typically has n>8 repeating units.

Suitable polymeric formaldehyde starter compounds preferably have molar masses of 62 to 30 000 g/mol, more preferably of 62 to 12 000 g/mol, particularly preferably of 242 to 6000 g/mol and very particularly preferably of 242 to 3000 g/mol and preferably comprise from 2 to 1000, preferably from 2 to 400, particularly preferably from 8 to 200 and very particularly preferably from 8 to 100 oxymethylene repeating units. The employed starter compounds typically have a functionality (F) of 1 to 3, but in certain cases may also have higher functionality, i.e. have a functionality of >3. It is preferable to employ open-chain polymeric formaldehyde starter compounds having terminal hydroxyl groups and having a functionality of 1 to 10, preferably of 1 to 5, particularly preferably of 2 to 3. It is very particularly preferable to employ linear polymeric formaldehyde starter compounds having a functionality of 2. The functionality F corresponds to the number of OH end groups per molecule.

Production of the polymeric formaldehyde starter compounds may be carried out by known processes (cf., for example, M. Haubs et al., 2012, Polyoxymethylenes, Ullmann's Encyclopedia of Industrial Chemistry; G. Reus et al., 2012, Formaldehyde, ibid.). The formaldehyde starter compounds may in principle also be employed in the form of a copolymer, wherein comonomers incorporated in the polymer in addition to formaldehyde are, for example, 1,4-dioxane or 1,3-dioxolane. Further suitable formaldehyde copolymers are copolymers of formaldehyde and of trioxane with cyclic and/or linear formals, for example butanediol formal, or epoxides. It is likewise conceivable for higher homologous aldehydes, for example acetaldehyde, propionaldehyde, etc, to be incorporated into the formaldehyde polymer as comonomers. It is likewise conceivable for formaldehyde starter compounds in turn to be produced from H-functional starter compounds; the use of polyfunctional starter compounds in particular makes it possible to obtain polymeric formaldehyde starter compounds having a hydroxyl end group functionality F>2 (cf., for example, WO 1981001712 A1, Bull. Chem. Soc. J., 1994, 67, 2560-2566, U.S. Pat. No. 3,436,375, JP 03263454, JP 2928823).

It is also possible to employ mixtures of different polymeric formaldehyde starter compounds or mixtures with other H-functional starter compounds. Suitable H-functional starter substances (starters) that may be used are compounds having alkoxylation-active H atoms which preferably have a molar mass of 18 to 4500 g/mol, more preferably of 62 to 2500 g/mol and particularly preferably of 62 to 1000 g/mol. Alkoxylation-active groups having active H atoms include, for example, —OH, —$NH_2$ (primary amines), —NH— (secondary amines), —SH, and —$CO_2H$, preferably —OH and —$NH_2$, particularly preferably-OH. H-Functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyethercarbonate polyols, polycarbonate polyols, polycarbonates, polyethyleneimines, polyetheramines, polytetrahydrofurans (e.g. PolyTHF® from BASF), polytetrahydrofuran amines, polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters containing an average of at least 2 OH groups per molecule.

As is well known, formaldehyde requires only the presence of small traces of water to polymerize. In aqueous solution, therefore, depending on the concentration and temperature of the solution, a mixture of oligomers and polymers of different chain lengths forms, in equilibrium with molecular formaldehyde and formaldehyde hydrate. So-called paraformaldehyde here precipitates out of the solution as a white, poorly soluble solid and is generally a mixture of linear formaldehyde polymers where n=8 to 100 oxymethylene repeating units.

Polymeric formaldehyde, i.e. so-called paraformaldehyde, which is commercially available at low cost may be directly employed as the starter compound. Paraformaldehyde it therefore employed as the starter compound in an advantageous embodiment. It is in particular possible via the molecular weight and the end group functionality of the polymeric formaldehyde starter compound to introduce polyoxymethylene blocks of defined molar weight and functionality into the product.

The length of the polyoxymethylene block may advantageously be controlled in simple fashion via the molecular weight of the employed formaldehyde starter compound. Preferably employed here are linear formaldehyde starter compounds of general formula HO—$(CH_2O)_n$—H, wherein n is an integer $\geq 2$, preferably where n=2 to 1000, particularly preferably where n=2 to 400 and very particularly preferably where n=8 to 100, having two terminal hydroxyl groups. Especially also employable as starter compounds are mixtures of polymeric formaldehyde compounds of formula HO—$(CH_2O)$—H having different values of n in each case. In an advantageous embodiment the employed mixtures of polymeric formaldehyde starter compounds of formula HO—$(CH_2O)_n$—H contain at least 1% by weight, preferably at least 5% by weight and particularly preferably at least 10% by weight of polymeric formaldehyde compounds where n≥20.

This makes it possible in particular to obtain polyoxymethylene block copolymers having an A-B-A block structure comprising an inner polyoxymethylene block (B) and outer oligomeric blocks (A).

A polyoxymethylene block in the context of the invention refers to a polymeric structural unit —$(CH_2$—$O$—$)_x$, wherein x is an integer $\geq 2$, containing at least one $CH_2$ group bonded to two oxygen atoms which is bonded via at least one of the oxygen atoms to further methylene groups or other polymeric structures. Polyoxymethylene blocks —$(CH_2$—$O$—$)_x$ preferably contain an average of x≥2 to x≤1000, more preferably an average of x≥2 to x≤400 and especially preferably an average of x≥8 to x≤100 oxymethylene units. In the context of the invention a polyoxymethylene block is also to be understood as meaning blocks containing small proportions of further monomeric and/or oligomeric units, generally less than 25 mol % based on the total amount of the monomer units present in the block.

The outer oligomeric blocks (A) polyoxyalkylene or polyoxyalkylene carbonate blocks, wherein in the context of the invention polyoxyalkylene blocks are also to be understood as meaning blocks incorporating (small) proportions of further comonomers, in particular carbonate, generally of less than 50 mol %, preferably less than 25 mol %, based on the total amount of all the repeating units present in the oligomeric block.

A polyoxyalkylene carbonate block in the context of the invention refers to a polymeric structural unit —O[$(C_2R^1R^2R^3R^4O)_x(CO_2)(C_2R^1R^2R^3R^4O)_y]_z$— where x≥1, y≥0 and z≥1, wherein $R^1$, $R^2$, $R^3$ and $R^4$ may independently of one another be hydrogen, an alkyl or aryl radical optionally containing additional heteroatoms such as nitrogen, oxygen, silicon, sulfur or phosphorus and may differ in different repeating units. The term "alkyl" in the context of the overall invention generally includes substituents from the group of n-alkyl such as methyl, ethyl or propyl, branched alkyl and/or cycloalkyl. The term "aryl" in the context of the overall invention generally includes substituents from the group of monocyclic carbo- or heteroaryl substituents such as phenyl and/or polycyclic carbo- or heteroaryl substituents which may optionally be substituted by further alkyl groups and/or heteroatoms such as nitrogen, oxygen, silicon, sulfur or phosphorus. The radicals $R^1$, $R^2$, $R^3$ and/or $R^4$ may be joined to one another within a repeating unit such that they form cyclic structures, for example a cycloalkyl radical incorporated into the polymer chain via two adjacent carbon atoms.

The process makes it possible, proceeding from formaldehyde starter compounds present as a mixture of different polymer chain lengths, for example paraformaldehyde, to obtain polyoxymethylene copolymers having a low content of by-products and decomposition products and a narrow molecular weight distribution. Without wishing to be bound to a particular theory, it can be assumed that, during the step of activating the DMC catalyst, there is likewise conditioning of the formaldehyde starter compound, preventing the formation of by-products and decomposition products (for example formates, methoxy derivatives, monomeric formaldehyde) and defragmentation of the polymeric formaldehyde to give shorter chain lengths and simultaneously achieving sufficient activity and selectivity of the catalyst. This involves conversion of the formaldehyde starter compound present in thermally and chemically labile and usually insoluble hemiacetal form by the reaction with the alkylene oxide to a thermally and chemically stable form. Surprisingly, the step of activation of the DMC catalyst can be combined with the conditioning of the polymeric formaldehyde starter and can be performed in a particularly advantageous manner at unexpectedly mild temperatures. Nothing of this kind was to be expected, since DMC catalysts typically require much higher temperatures, for example of 130° C., for activation. The conditioning of the formaldehyde starter compound in the presence of the DMC catalyst enables reaction of the starter with alkylene oxides and any further comonomers in the subsequent polymerization step at higher reaction temperatures as well, without any further defragmentation and/or the formation of by-products and decomposition products. A further advantage is that the conditioned formaldehyde starter compound usually has much higher solubility after the conditioning, such that only small amounts of or no further solvents and/or suspension media are required.

The process further makes it possible to ensure that an active DMC catalyst system for the polymerization is present, and a steadily progressing polymerization with continuous addition of the comonomers ensures a safe process and high product quality.

The activation of the DMC catalyst is therefore carried out in the presence of the polymeric formaldehyde starter compound. The starter compound and the DMC catalyst may optionally be suspended in a suspension medium. It is likewise also possible to use a further liquid starter compound ("co-starter") in the mixture, the DMC catalyst and the polymeric formaldehyde starter compound being suspended therein.

The DMC catalyst is preferably activated at an activation temperature $T_{act}$ in the range from 20° C. to 120° C., preferably at 30° C. to 120° C., particularly preferably at 40° C. to 100° C. and very particularly preferably at 60° C. to 100° C.

"Activation" of the DMC catalyst is to be understood as meaning a step in which a portion of alkylene oxide is added to the DMC catalyst suspension at the specific activation temperature before the addition of the alkylene oxide is interrupted and due to a subsequent exothermic chemical reaction an evolution of heat, which can lead to a temperature spike ("hotspot"), is observed and due to the conversion of alkylene oxide a pressure drop in the reactor is observed.

DMC catalysts for use in the homopolymerization of alkylene oxides that are suitable for the process are known in principle from the prior art (see, for example, U.S. Pat. Nos. 3,404,109, 3,829,505, 3,91,849 and 5,158,922). DMC catalysts, described, for example, in U.S. Pat. No. 5,470,813, EP-A 700 949, EP-A 743 093, EP-A 761 708, WO 97/40086, WO 98/16310 and WO 00/47649, have very high activity in the polymerization of alkylene oxides and in some cases the copolymerization of alkylene oxides with suitable comonomers and they make it possible to produce polyoxymethylene copolymers at very low catalyst concentrations so that removal of the catalyst from the finished product is generally no longer required. A typical example is that of the highly active DMC catalysts described in EP-A 700 949 which contain not only a double metal cyanide compound (e.g. zinc hexacyanocobaltate(III)) and an organic complex ligand (e.g. tert-butanol) but also a polyether having a number-average molecular weight greater than 500 g/mol.

The concentration of DMC catalyst employed is 10 to 10000 ppm, particularly preferably 20 to 5000 ppm and most preferably 50 to 2000 ppm based on the mass of the polyoxymethylene block copolymer to be produced. According to the profile of requirements for the downstream use the DMC catalyst can be left in the product or (partially) removed. The (partial) removal of the DMC catalyst can be effected, for example, by treatment with adsorbents and/or filtration. Methods of removing DMC catalysts are described, for example, in U.S. Pat. No. 4,987,271, DE-A-3132258, EP-A-0 406 440, U.S. Pat. Nos. 5,391,722, 5,099, 075, 4,721,818, 4,877,906 and EP-A-0 385 619.

Epoxides (alkylene oxides) used for producing the polyoxymethylene block copolymers are compounds of general formula (I):

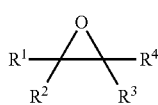

(I)

wherein $R^1$, $R^2$, $R^3$ and $R^4$ are independently of one another hydrogen or an alkyl or aryl radical optionally containing additional heteroatoms such as nitrogen, oxygen, silicon, sulfur or phosphorus and may optionally be joined to one another such that they form cyclic structures such as a cycloalkylene oxide for example.

In the context of the process it is in principle possible to use any alkylene oxides suitable for polymerization in the presence of a DMC catalyst. If different alkylene oxides are used these may be metered in either as a mixture or consecutively. In the case of the latter metered addition, the polyether chains of the polyoxymethylene-polyoxyalkylene block copolymer obtained in this way may in turn likewise have a block structure.

The process may generally employ alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkyloxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. The epoxide of general formula (I) is preferably a terminal epoxide wherein $R^1$, $R^2$ and $R^3$ are hydrogen and $R^4$ may be hydrogen, an alkyl or aryl radical optionally containing additional heteroatoms such as nitrogen, oxygen, silicon, sulfur or phosphorus and may differ in different repeating units. Preferably employed alkylene oxides are ethylene oxide and/or propylene oxide, especially propylene oxide.

The process is preferably performed such that the activation of the catalyst and the conditioning of the polymeric formaldehyde starter compound in step (β) are followed by a polymerization step (γ) with metered addition of one or more alkylene oxides. The process may in principle also be terminated after step (β) so that the conditioned polymeric formaldehyde starter compound then constitutes the end product of the process. Said compound generally has a high stability as a result of the conditioning and if desired may be employed as an OH-functional unit for a very wide variety of consecutive reactions analogously to the polyoxymethylene block copolymer obtained from step (γ).

In a further embodiment of the process the polymerization of the alkylene oxides is carried out in the presence of a further comonomer. Employable further comonomers include for example any oxygen-containing cyclic compounds, especially cyclic ethers, for example oxetane, THF, dioxane or cyclic acetals, for example 1,3-dioxolane or 1,3-dioxepane, cyclic esters, for example γ-butyrolactone, γ-valerolactone, ε-caprolactone, or cyclic acid anhydrides, for example maleic anhydride, glutaric anhydride or phthalic anhydride, and carbon dioxide. Preference is given to using carbon dioxide as comonomer.

Further comonomers may be metered into the reaction in pure form, in solution or as a mixture with one or more alkylene oxides. The metered addition of further comonomers may likewise be carried out simultaneously with or subsequently to the metered addition of the alkylene oxides.

A preferred embodiment of the process comprises not only addition of the alkylene oxide(s) onto the polymeric formaldehyde starter compound but also addition of carbon dioxide ($CO_2$) as a further comonomer. This makes it possible to produce polyoxymethylene-polyoxyalkylene carbonate copolymers. Compared to existing products (for example polyether polyols in the polyurethane sector or polyoxymethylene (co-)polymers in the POM sector) these additionally comprise $CO_2$ as an inexpensive and environmentally friendly comonomer. Since $CO_2$ is, inter alia, a waste product from energy generation from fossil raw materials and is being sent for further chemical utilization, the incorporation of $CO_2$ into the polymer structures provides not only economic but also environmental benefits (favorable $CO_2$ balance of the product polymers, etc.).

Polyoxymethylene-polyoxyalkylene carbonate block copolymers in the context of the invention refer to polymeric compounds containing at least one polyoxymethylene block and at least one polyoxyalkylene carbonate block. Polyoxymethylene-polyoxyalkylene carbonate block copolymers are of particular interest as feedstocks in the polyurethane sector and for applications in the polyoxymethylene (POM) sector. By altering the $CO_2$ content, the physical properties can be matched to the particular use, thus making it possible to develop new fields of application for these block copolymers. The process especially makes it possible to provide polyoxymethylene-polyoxyalkylene carbonate copolymers, wherein a high content of incorporated $CO_2$ is achieved and the products have a comparatively low polydispersity and contain a very low level of by-products and decomposition products of the polymeric formaldehyde.

There follows a detailed description of several variants for performing the process for producing polyoxymethylene block copolymers by addition of alkylene oxides and optionally further comonomers onto polymeric formaldehyde starter compounds. This is merely exemplary.

The process is for example characterized in that in the first step (i)

(α) a suspension medium or a polymeric formaldehyde starter compound is initially charged and any optional water and/or other volatile compounds are removed by elevated temperature and/or reduced pressure ("drying"), wherein the DMC catalyst is added to the polymeric formaldehyde starter compound or to the suspension medium before or after the drying, (β) to achieve activation of the DMC catalyst in the presence of the polymeric formaldehyde starter compound a portion (based on the total amount of alkylene oxides employed in the activation and polymerization) of one or more alkylene oxides is added to the mixture resulting from step (α), wherein this addition of a portion of alkylene oxide may optionally be carried out in the presence of further comonomers, such as especially $CO_2$, and wherein the temperature spike ("hotspot") which occurs due to the exothermic chemical reaction that follows and/or a pressure drop in the reactor is then awaited in each case, and wherein the step (β) for achieving activation may also be carried out repeatedly, and in the second step (ii)

(γ) one or more alkylene oxides and optionally further comonomers, especially carbon dioxide, are added to the mixture resulting from step (β), wherein the alkylene oxides employed in step (γ) may be identical or different to the alkylene oxides employed in step (β) ("polymerization"), wherein at least one polymeric formaldehyde starter compound is added at least in one of the steps (α) and (β).

The polymeric formaldehyde starter compound may be initially charged together with the DMC catalyst and the suspension medium in step (α), or preferably after the drying, no later than in step (β).

Any suspension media used generally do not contain any H-functional groups. Suitable suspension media are any polar aprotic, weakly polar aprotic and nonpolar aprotic solvents, none of which contain any H-functional groups. A mixture of two or more of these suspension media may also be employed as the suspension medium. Examples of polar aprotic suspension media that may be mentioned here include: 4-methyl-2-oxo-1,3-dioxolane (also referred to hereinbelow as cyclic propylene carbonate or cPC), 1,3-dioxolan-2-one (also referred to hereinbelow as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of nonpolar and weakly polar aprotic suspension media includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media include 4-methyl-2-oxo-1,3-dioxolane, 1,3-dioxolan-2-one, toluene, xylene, ethylbenzene, chlorobenzene and dichlorobenzene and also mixtures of two or more of these suspension media; particular preference is given to 4-methyl-2-oxo-1,3-dioxolane and 1,3-dioxolan-2-one and toluene or a mixture of 4-methyl-2-oxo-1,3-dioxolane and 1,3-dioxolan-2-one and/or toluene. It is likewise possible to use as the suspension medium a further starter compound, that is in liquid form under the reaction conditions, in a mixture with the polymeric formaldehyde starter compound.

Step (a): (Drying)

The addition of the individual components in step (a) may be carried out simultaneously or consecutively in any sequence.

It is preferable when in step (a) a suspension medium containing no H-functional groups is initially charged in the reactor. Subsequently, the amount of DMC catalyst required for the polymerization, which is preferably unactivated, is introduced into the reactor. The sequence of addition is not critical. It is also possible to charge the reactor firstly with the DMC catalyst and subsequently with the suspension medium. It is alternatively also possible to suspend the DMC catalyst in the suspension medium first and to charge the reactor with the suspension subsequently. The suspension medium provides an adequate heat exchange area with the reactor wall or cooling elements installed in the reactor and the liberated heat of reaction can therefore be removed very efficiently. Furthermore, in the event of a cooling failure, the suspension medium provides heat capacity so that the temperature in this case may be kept below the decomposition temperature of the reaction mixture. Alternatively, it is also possible in step (α) to initially charge in the reactor a suspension medium containing no H-functional groups and additionally a portion of the polymeric formaldehyde starter compound and optionally DMC catalyst, or it is also possible in step (α) to initially charge in the reactor a portion of the polymeric formaldehyde starter compound and optionally DMC catalyst. It is further also possible in step (α) to initially charge in the reactor the total amount of the polymeric formaldehyde starter compound and optionally DMC catalyst.

The polymeric formaldehyde starter compound may be initially charged as a mixture with further polymeric formaldehyde starter compounds or other H-functional starter compounds.

The process may be performed such that in step (α) a suspension medium, the polymeric formaldehyde starter compound and the DMC catalyst are initially charged and optionally water and/or other volatile compounds are removed by elevated temperature and/or reduced pressure ("drying") or in an alternative embodiment step (α) is performed such that in a step (α1) a suspension medium and the DMC catalyst are initially charged and optionally water and/or other volatile compounds are removed by elevated temperature and/or reduced pressure ("drying") and in a subsequent step (α2) the formaldehyde starter compound is added to the mixture from step (α1). The addition of the polymeric formaldehyde starter compound may be carried out after cooling of the reaction mixture from step (α1), especially at room temperature, or the reaction mixture may already be brought to the temperature prevailing in subsequent step (β) and the addition may be carried out at this temperature. The formaldehyde starter compound is generally added under inert conditions.

The DMC catalyst is preferably used in an amount such that the content of DMC catalyst in the resulting reaction product is 10 to 10 000 ppm, particularly preferably 20 to 5000 ppm and most preferably 50 to 2000 ppm.

In a preferred embodiment inert gas (for example argon or nitrogen), an inert gas/carbon dioxide mixture or carbon dioxide is introduced into the resulting mixture of suspension medium and DMC catalyst and/or the polymeric formaldehyde starter compound at a temperature of 90° C. to 150° C., particularly preferably of 100° C. to 140° C., and at the same time a reduced pressure (absolute) of 10 mbar to 800 mbar, particularly preferably of 50 mbar to 200 mbar, is applied.

In an alternative preferred embodiment the resulting mixture of DMC catalyst and suspension medium and/or polymeric formaldehyde starter compound is pressurized at a temperature of 90° C. to 150° C., particularly preferably of 100° C. to 140° C., at least once, preferably three times, with 1 bar to 100 bar (absolute), particularly preferably 3 bar to 50 bar (absolute), of an inert gas (for example argon or nitrogen), an inert gas/carbon dioxide mixture or carbon dioxide and in each case the positive pressure is subsequently reduced to about 1 bar to 20 bar (absolute).

The DMC catalyst may be added for example in solid form or in the form of a suspension in a suspension medium or two or more suspension media or—if the polymeric formaldehyde starter compound is in a liquid state of matter—as a suspension in a polymeric formaldehyde starter compound.

Step (β): (Activation)

Step (β) serves to activate the DMC catalyst. This step may optionally be performed under an inert gas atmosphere, under an atmosphere of inert gas/carbon dioxide mixture or under a carbon dioxide atmosphere. Activation in the context of the present invention refers to a step in which a portion of alkylene oxide is added to the DMC catalyst suspension at temperatures of 20° C. to 120° C. ("activation temperature") and then the addition of the alkylene oxide is stopped and due to a subsequent exothermic chemical reaction an evolution of heat, which can lead to a temperature spike ("hotspot"), is observed and due to the conversion of alkylene oxide and possibly $CO_2$ a pressure drop in the reactor is observed.

In a preferred embodiment the amount of one or more alkylene oxides employed in the activation in step (β) is 2 to 100 molar equivalents, preferably 4 to 50 molar equivalents, particularly preferably 4.5 to 25 molar equivalents, based on the molar amount of polymeric formaldehyde starter compound employed and using the number-average molecular weight ($M_n$) of the formaldehyde starter compound or of the mixtures employed as the basis. The alkylene oxide can be added in one step or stepwise in two or more portions. It is preferable when after addition of a portion of alkylene oxide the addition of the alkylene oxide is interrupted until the evolution of heat occurs and the next portion of alkylene oxide is added only then.

For the process it has further been found that the activation (step (β)) in the presence of the polymeric formaldehyde starter compound for production of the polyoxymethylene block copolymers is advantageously performed at an activation temperature $T_{act}$ of 20° C. to 120° C., preferably at 30° C. to 120° C., particularly preferably at 40° C. to 100° C. and very particularly preferably at 60° C. to 100° C. The evolution of heat resulting due to the chemical reaction in the activation of the DMC catalyst preferably does not lead to exceedance of a temperature of 120° C. in the reaction vessel. Below 20° C. the reaction proceeds only very slowly, and activation of the DMC catalyst takes a disproportionately long time or may not take place to the desired extent. At temperatures of 130° C. and higher, the amount of undesired by-products/decomposition products of polymeric formaldehyde starter compounds increases severely. Formation of formate and methoxy traces is observed for example. It has further been found to be an advantage of this embodiment that it is likewise possible to influence the properties of the polyoxymethylene block copolymer obtained, especially the length of the polyoxymethylene block, through precise adjustment of the parameters within this range.

The process step of activation is the period from the addition of the portion of alkylene oxide, optionally in the presence of $CO_2$, to the reaction mixture comprising a suspension medium, DMC catalyst and the formaldehyde starter compound until the occurrence of the evolution of heat (exothermicity). The portion of the alkylene oxide may optionally be added to the reaction mixture in a plurality of individual steps, optionally in the presence of $CO_2$, and the addition of the alkylene oxide then interrupted in each case. In this case the process step of activation comprises the period from the addition of the first portion of alkylene oxide, optionally in the presence of $CO_2$, to the reaction mixture until occurrence of the evolution of heat after addition of the last portion of alkylene oxide. The activation step may generally be preceded by a step for drying the DMC catalyst and optionally the polymeric formaldehyde starter compound at elevated temperature and/or reduced pressure, optionally while passing an inert gas through the reaction mixture, wherein this step of drying is not part of the activation step in the context of the present invention.

Metered addition of one or more alkylene oxides (and optionally of the further comonomers, especially carbon dioxide) may in principle be carried out in different ways. Commencement of the metered addition may be carried out at the reduced pressure or at a previously chosen supply pressure. The supply pressure is preferably established by introducing an inert gas (for example nitrogen or argon) or carbon dioxide, wherein the pressure (absolute) is 5 mbar to 100 bar, by preference 10 mbar to 50 bar and preferably 20 mbar to 50 bar.

Another alternative embodiment is a two-stage activation (step β), wherein
(β-I) in a first activation stage the addition of a first portion of alkylene oxide is carried out under an inert gas atmosphere and
(β-II) in a second activation stage the addition of a second portion of alkylene oxide is carried out under a carbon dioxide atmosphere,
wherein the polymeric formaldehyde starter compound may be added before and after substep (β☐I).

Step (γ): (Polymerization)

The metered addition of one or more alkylene oxides may be carried out simultaneously or sequentially via separate metered additions in each case or via one or more metered editions. If two or more alkylene oxides are used for synthesis of the polyoxymethylene block copolymers the alkylene oxides may be metered in individually or as a mixture.

For the process it has further been found that the polymerization for producing the polyether block in the polyoxymethylene-polyoxyalkylene block copolymers (step (γ)) is advantageously performed at 50° C. to 150° C., preferably at 60° C. to 145° C., particularly preferably at 70° C. to 140° C. and very particularly preferably at 90° C. to 130° C. If temperatures are set to below 50° C. the reaction proceeds disproportionately slowly. At temperatures above 150° C. the amount of unwanted by-products rises significantly.

In a further embodiment of the process the polymerization is carried out in the presence of at least one comonomer. Further comonomers may be metered into the reaction in pure form, in solution or otherwise in any industrially realizable forms. The metered addition of one or more alkylene oxides and the comonomers may be carried out simultaneously or sequentially, wherein the total amount of comonomers may be added all at once or in the form of a metered addition over the reaction time. In a preferred embodiment carbon dioxide is metered in as a comonomer. The metered addition of one or more alkylene oxides is carried out simultaneously or sequentially with the metered addition of carbon dioxide. Via the manner of metered addition of the alkylene oxides and the comonomers, preferably carbon dioxide, it is possible to synthesize polyoxymethylene block copolymers having random, alternating, block-type or gradient-type polyether and/or polyoxyalkylene carbonate blocks.

In the production of the polyoxymethylene-polyoxyalkylene carbonate block copolymers with copolymerization of $CO_2$ as a comonomer it is preferable to use an excess of carbon dioxide based on the expected or estimated amount of carbon dioxide incorporated into the polyoxyalkylene carbonate block, since an excess of carbon dioxide is advantageous due to the inertness of carbon dioxide. The amount of carbon dioxide may be determined via the total pressure under the particular reaction conditions. A total (absolute) pressure in the range from 0.01 to 120 bar, preferably 0.1 to 110 bar, particularly preferably from 1 to 100 bar has proven advantageous for the copolymerization for producing the polyoxyalkylene carbonate block. It has further been shown that the copolymerization for producing the polyoxyalkylene carbonate block is advantageously performed at 50° C. to 150° C., preferably at 60° C. to 145° C., particularly preferably at 70° C. to 140° C. and very particularly preferably at 90° C. to 130° C. When temperatures are set to below 50° C. the reaction proceeds disproportionately slowly. At temperatures above 150° C. the amount of unwanted by-products increases severely. It should further be considered when selecting pressure and temperature that the $CO_2$ is ideally converted from the gaseous state into the liquid and/or supercritical state. However, $CO_2$ may also be added to the reactor in solid form and then converted into the liquid and/or supercritical fluid state under the selected reaction conditions.

Carbon dioxide may be used in the gaseous, solid, liquid or supercritical state, preferably in the gaseous or solid state, particularly preferably in the gaseous state. When using carbon dioxide in the gaseous state, a partial carbon dioxide pressure of 1 to 73.8 bar, preferably of 1 to 60 bar, particularly preferably of 5 to 50 bar, is chosen. When using gaseous carbon dioxide the combination of pressure and temperature is chosen such that carbon dioxide in pure form is in the gaseous state under the chosen reaction conditions. The corresponding conditions are derivable from the phase diagram. After introduction into the reactor gaseous carbon dioxide partially or fully dissolves in the reaction mixture.

The three steps (α), (β) and (γ) may be performed in the same reactor or each performed separately in different reactors. Particularly preferred reactor types for the process are stirred tanks, tubular reactors, and loop reactors. It is also possible to use extruders, kneaders, etc. as preferred reactors for the process. If the reaction steps α, β and γ are performed in different reactors a different reactor type may be used for each step. In the case of completely continuous reaction management the individual steps should preferably be spatially separate from one another, i.e. steps (α) and (β) spatially separate from (γ), so that a separate temperature management and suitable gas introduction and application of reduced pressure, addition of polymeric formaldehyde and metered addition of monomers in the individual steps is possible.

The thermal and chemical stability of the polyoxymethylene block copolymers/the product mixtures obtained from the process especially allows distillative workup thereof. It is preferable to employ thin-film evaporators, strand evaporators and stripping columns and also combinations thereof to remove solvents or suspension media, volatile constituents and unreacted monomers and/or oligomers. However all other apparatuses for thermal distillative workup are also suitable in principle. This mode of workup may be carried out continuously or batchwise and also simultaneously with or subsequently to the reaction.

The molecular weight of the polyoxymethylene block copolymers is especially the sum of the molecular weight of the polymeric formaldehyde starter compound and the addition-polymerized blocks. In one embodiment the polyoxymethylene block copolymers have a number-average molecular weight of ≤15 000 g/mol, preferably ≤9500 g/mol, particularly preferably ≤6000 g/mol, very particularly preferably ≤5000 g/mol, especially of 200 g/mol to 9500 g/mol, preferably of 500 g/mol to 5000 g/mol. The number-average molecular weight may be determined for example by gel permeation chromatography (GPC) against polystyrene standards for example and/or via experimentally determined hydroxyl numbers (OH #).

The polyoxymethylene block copolymers obtainable by the process have a block structure comprising an inner polyoxymethylene block (B) comprising at least 2 and at most 1000 oxymethylene units, preferably at least 2 and at most 400 oxymethylene units, particularly preferably from 8 to 200, very particularly preferably at least 8 and at most 100, oxymethylene units, and at least one outer oligomeric block (A) preferably comprising a proportion of at least 25 mol %, particularly preferably at least 50 mol %, of polyoxyalkylene units, based on the total amount of all oligomer units in this block. The number of outer oligomeric blocks (A) results accordingly from the functionality of the formaldehyde starter compound used. The polyoxymethylene-polyoxyalkylene block copolymer preferably consists exclusively of the blocks A and B. In an advantageous embodiment the outer oligomeric block is a polyoxyalkylene block, particularly preferably a polyoxyalkylene carbonate block.

The polyoxymethylene block copolymers preferably have terminal hydroxyl groups and preferably have a functionality F≥2 (number of hydroxyl groups per molecule).

In a further embodiment of the polyoxymethylene block copolymers, said polymers have a monomodal molecular weight distribution and a polydispersity index (PDI) of ≤2.5, preferably ≤2.2.

The polyoxymethylene block copolymers obtainable by the process preferably contain less than 2% by weight, especially less than 1% by weight, based on the total mass of the polyoxymethylene block copolymer obtained, of formate and/or methoxy impurities.

Likewise suitable is a polyoxymethylene-polyoxyalkylene carbonate block copolymer comprising an inner polyoxymethylene block ("starter") and at least one outer polyoxyalkylene carbonate block of formula (II)

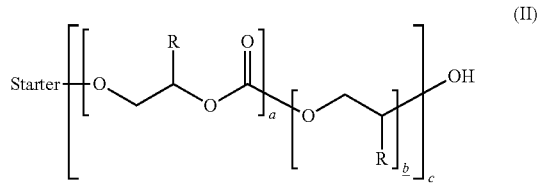

wherein R represents an organic radical such as alkyl, alkylaryl, arylalkyl or aryl, each of which may also contain heteroatoms, for example O, S, Si etc., and wherein a, b and c are each an integer and R may differ in different repeat units, and wherein the structural unit "starter" represents a polyoxymethylene block deriving from the polymeric formaldehyde starter compound, and wherein the product for the polyoxymethylene-polyoxyalkylene carbonate block copolymer shown here in scheme (II) is merely to be understood as meaning that blocks having the structure shown may in principle be found in the polyoxymethylene-polyoxyalkylene carbonate block copolymer obtained, but the sequence, number and length of the blocks and the OH functionality of the "starter" may vary and is not limited to the polyoxymethylene-polyoxyalkylene block copolymer shown in scheme (II).

The polyoxymethylene block copolymers obtainable by the process generally have a low content of by-products and decomposition products, such as formate, methoxy traces, monomeric and oligomeric formaldehyde and residual monomers, and may be readily subjected to further processing.

The component A2 and/or A12 is a compound having 2 to 6, preferably from 2 to 4 and particularly preferably from 2 to 3 Zerewitinoff-active H atoms selected from the group of polyether polyols, polyester polyols, polyether ester polyols, polycarbonate polyols and/or polyacrylate polyols. Hydrogen bonded to N, O or S is referred to as Zerewitinoff-active hydrogen (or as "active hydrogen") if it affords methane by reaction with methylmagnesium iodide by a method discovered by Zerewitinoff.

The polyols preferably have a number-average molecular weight $M_n$ of ≥62 g/mol to ≤8000 g/mol, preferably of ≥90 g/mol to ≤5000 g/mol and particularly preferably of ≥92 g/mol to ≤2000 g/mol. In the present invention the number-average molecular weight may be determined by gel permeation chromatography using polystyrene standards.

Preferred as component A2/A12 are block copolymers of a starter molecule having a weight fraction <10% by weight, one propylene oxide block per reactive group of the starter molecule and then one ethylene oxide end block, wherein on average over all components A2 and A12 the molar proportion of propylene oxide is greater than that of ethylene oxide.

Employable polyether polyols also include for example polytetramethylene glycol polyethers such as are obtainable by polymerization of tetrahydrofuran by cationic ring opening.

Suitable starter molecules for the polyether polyols are, for example, water, ethylene glycol, diethylene glycol, butyl diglycol, glycerol, diethylene glycol, trimethylolpropane, propylene glycol, pentaerythritol, sorbitol, sucrose, ethylenediamine, toluenediamine, triethanolamine, butane-1,4-diol, hexane-1,6-diol and low molecular weight hydroxyl-containing esters of such polyols with dicarboxylic acids.

Suitable polyester polyols are inter alia polycondensates of di- and also tri- and tetraols and di- and also tri- and tetracarboxylic acids or hydroxycarboxylic acids or lactones. Also employable for producing the polyesters instead of the free polycarboxylic acids are the corresponding polycarboxylic anhydrides or corresponding polycarboxylic esters of lower alcohols.

Examples of suitable diols are ethylene glycol, butylene glycol, diethylene glycol, triethylene glycol, polyalkylene glycols such as polyethylene glycol, and also propane-1,2-diol, propane-1,3-diol, butane-1,3-diol, butane-1,4-diol, hexane-1,6-diol and isomers, neopentyl glycol or neopentyl glycol hydroxypivalate. Also employable in addition are polyols such as trimethylolpropane, glycerol, erythritol, pentaerythritol, trimethylolbenzene or trishydroxyethyl isocyanurate.

Examples of polycarboxylic acids that may be used include phthalic acid, isophthalic acid, terephthalic acid, tetrahydrophthalic acid, hexahydrophthalic acid, cyclohexanedicarboxylic acid, adipic acid, azelaic acid, sebacic acid, glutaric acid, tetrachlorophthalic acid, maleic acid, fumaric acid, itaconic acid, malonic acid, suberic acid, succinic acid, 2-methylsuccinic acid, 3,3-diethylglutaric acid, 2,2-dimethylsuccinic acid, dodecanedioic acid, endomethylenetetrahydrophthalic acid, dimer fatty acid, trimer fatty acid, citric acid, or trimellitic acid. It is also possible to use the corresponding anhydrides as the acid source.

Provided that the average functionality of the polyol to be esterified is >2, monocarboxylic acids such as benzoic acid and hexanecarboxylic acid may also be co-used.

Hydroxycarboxylic acids that may be co-used as reaction participants in the production of a polyester polyol having terminal hydroxyl groups are for example hydroxycaproic acid, hydroxybutyric acid, hydroxydecanoic acid, hydroxystearic acid and the like. Suitable lactones are inter alia caprolactone, butyrolactone and homologs.

Polycarbonate polyols that may be used are hydroxyl-containing polycarbonates, for example polycarbonate diols. These are obtainable by reaction of carbonic acid derivatives, such as diphenyl carbonate, dimethyl carbonate or phosgene, with polyols, preferably diols.

Examples of such diols are ethylene glycol, propane-1,2- and 1,3-diol, butane-1,3- and 1,4-diol, hexane-1,6-diol, octane-1,8-diol, neopentyl glycol, 1,4-bishydroxymethylcyclohexane, 2-methyl propane-1,3-diol, 2,2,4-trimethylpentane-1,3-diol, dipropylene glycol, polypropylene glycols, dibutylene glycol, polybutylene glycols, bisphenol A and lactone-modified diols of the abovementioned type.

Employable polyether ester polyols are compounds containing ether groups, ester groups and OH groups. Organic dicarboxylic acids having up to 12 carbon atoms are suitable for producing the polyether ester polyols, preferably aliphatic dicarboxylic acids having ≥4 to ≤6 carbon atoms or aromatic dicarboxylic acids used individually or in a mixture. Examples include suberic acid, azelaic acid, decanedicarboxylic acid, maleic acid, malonic acid, phthalic acid, pimelic acid and sebacic acid and in particular glutaric acid, fumaric acid, succinic acid, adipic acid, phthalic acid, terephthalic acid and isoterephthalic acid. Derivatives of these acids that may be used include, for example, their anhydrides and also their esters and semi-esters with low molecular weight monofunctional alcohols having ≥1 to ≤4 carbon atoms.

Further components used for production of the polyether ester polyols are polyether polyols obtainable by alkoxylating starter molecules, for example polyhydric alcohols. The starter molecules are at least difunctional, but may optionally also contain proportions of higher-functional, in particular trifunctional, starter molecules.

Starter molecules for these polyether polyols are, for example, diols having number-average molecular weights $M_n$ of preferably ≥18 g/mol to ≤400 g/mol or of ≥62 g/mol to ≤200 g/mol, such as ethane-1,2-diol, propane-1,3-diol, propane-1,2-diol, butane-1,4-diol, pentene-1,5-diol, pentane-1,5-diol, neopentyl glycol, hexane-1,6-diol, heptane-1,7-diol, octane-1,8-diol, decane-1,10-diol, 2-methylpropane-1,3-diol, 2,2-dimethylpropane-1,3-diol, 3-methylpentane-1,5-diol, 2-butyl-2-ethylpropane-1,3-diol, 2-butene-1,4-diol and 2-butyne-1,4-diol, ether diols such as diethylene glycol, triethylene glycol, tetraethylene glycol, dibutylene glycol, tributylene glycol, tetrabutylene glycol, dihexylene glycol, trihexylene glycol, tetrahexylene glycol and oligomer mixtures of alkylene glycols, such as diethylene glycol.

In addition to the diols, polyols having number-average functionalities of >2 to ≤8, or of ≥3 to ≤4 may also be employed, examples being 1,1,1-trimethylolpropane, triethanolamine, glycerol, sorbitan and pentaerythritol and also triol- or tetraol-started polyethylene oxide polyols having average molecular weights of preferably ≥62 g/mol to ≤400 g/mol or of ≥92 g/mol to ≤200 g/mol.

Polyether ester polyols may also be produced by alkoxylation of reaction products obtained by reaction of organic dicarboxylic acids and diols. Derivatives of these acids that may be used include, for example, their anhydrides, for example phthalic anhydride.

Polyacrylate polyols are obtainable by free-radical polymerization of hydroxyl-containing, olefinically unsaturated monomers or by free-radical copolymerization of hydroxyl-containing, olefinically unsaturated monomers optionally with other olefinically unsaturated monomers. Examples thereof include ethyl acrylate, butyl acrylate, 2-ethylhexyl acrylate, isobornyl acrylate, methyl methacrylate, ethyl methacrylate, butyl methacrylate, cyclohexyl methacrylate, isobornyl methacrylate, styrene, acrylic acid, acrylonitrile and/or methacrylonitrile. Suitable hydroxyl-containing, olefinically unsaturated monomers are in particular 2-hydroxyethyl acrylate, 2-hydroxyethyl methacrylate, the hydroxypropyl acrylate isomer mixture obtainable by addition of propylene oxide onto acrylic acid, and the hydroxypropyl methacrylate isomer mixture obtainable by addition of propylene oxide onto methacrylic acid. Terminal hydroxyl groups may also be in protected form. Suitable free-radical initiators are those from the group of the azo compounds, for example azoisobutyronitrile (AIBN), or from the group of the peroxides, for example di-tert-butyl peroxide.

In a preferred embodiment of the prepolymer B2, A2 is a compound as defined for A12.

The present invention is more particularly described by the examples which follow without, however, being limited thereto.

EXAMPLES

Input Materials

| | |
|---|---|
| A1 | Polyoxymethylene-polypropylene oxide block copolymer (OH number 59 mg KOH/g, 22% by weight POM) produced by addition of propylene oxide onto polyoxymethylene with DMC catalysis. |
| A2 | Polyoxymethylene-polypropylene oxide block copolymer (OH number 41 mg KOH/g, 17% by weight POM) produced by addition of propylene oxide onto polyoxymethylene with DMC catalysis. |
| A3 | Mixture of a sorbitol-started polypropylene oxide-polyethylene oxide block copolymer (OH number 29 mg KOH/g, propylene oxide:ethylene oxide = 3:1 mol/mol, ethylene oxide as end blocks) and A1 in a weight ratio of 71:29. The average OH number is 37 mg KOH/g. |
| A4 | Mixture of a sorbitol-started polypropylene oxide-polyethylene oxide block copolymer (OH number 29 mg KOH/g, propylene oxide:ethylene oxide = 3:1 mol/mol, ethylene oxide as end blocks) and A2 in a weight ratio of 62:38. The average OH number is 36 mg KOH/g. |
| A5 | Propylene glycol-started polypropylene glycol having an OH number of 56 mg KOH/g (contains neither polyoxymethylene units nor ethylene oxide units). |
| A7 | Sorbitol-started polypropylene oxide-polyethylene oxide copolymer (OH number 96 mg KOH/g, propylene oxide:ethylene oxide = 1:5.9 mol/mol), employed as a cell opener. |
| A8 | Glycerol-started polypropylene oxide-polyethylene oxide copolymer (OH number 35 mg KOH/g, propylene oxide:ethylene oxide = 5:1 mol/mol). |
| B1 | Polymeric isocyanate (viscosity 0.2 Pa*s at 25° C., NCO content of 7.5 mol/kg). |
| B2 | Uretdione-modified 4,4'-methylenediisocyanate (viscosity of 0.055 Pa*s at 25° C., NCO content of 7.0 mol/kg), produced from 4,4'-methylene diisocyanate with 1-methylphospholene-1-oxide as a catalyst. |
| B3 | Stock solution of hydrogen chloride in a mixture of 4,4'-methylene diisocyanate and 2,4'-methylene diisocyanate in a 9:11 ratio. |

Production of the Prepolymers:

The components B1, B2 and B3 are mixed at room temperature and heated to 80° C. The components A1 or A2 are added dropwise over 30 minutes at this temperature. The mixture is kept at 80° C. for two hours. After cooling to 20° C. the reaction mixture is filled into aluminum bottles. Pp1=prepolymer according to the present invention. CPp2=comparative prepolymer

|  | Pp1 | CPp2 Comparative |  |
|---|---|---|---|
| B1 | 37.5 | 37.5 | parts by wt. |
| B2 | 50.0 | 50.0 | parts by wt. |
| B3 | 0.1 | 0.1 | parts by wt. |
| A1 |  | 12.4 | parts by wt. |
| A2 | 12.4 |  | parts by wt. |
| Sum | 100 | 100 | parts by wt. |
| Calculated POM content | 21.5 | 27.8 | g/kg |
| NCO content according to DIN 53185 (1997) | 6.18 | 6.12 | mol/kg |
| Viscosity at 25° C. according to DIN 53019-1 (September 2008) | 0.20 | 0.22 | Pa*s |

The prepolymer based on the polyol A2 has a 9% better viscosity.

Production of the Foams:

The ratio of isocyanate groups to isocyanate-reactive groups multiplied by 100 is described as the index. The following tests always compare foams produced using the same index. Indices of 70 and 90 were established in two test series as nowadays also employed analogously in the market for molded seats.

To produce the foams the required amount of polyol is initially charged into a cardboard beaker having a sheet metal bottom (volume: about 850 ml) and loaded with air using a stirring means (Pendraulik) fitted with a standard stirring disk (d=64 mm) at 4200 rpm for 45 seconds. Homogenization is carried out using the Pendraulik standard stirring disk (diameter 64 mm).

The isocyanate/isocyanate mixture/prepolymer is weighed into a suitable beaker and emptied again (efflux time: 3 s). This beaker still having wet internal walls is tared and refilled with the reported isocyanate quantity. The isocyanate is added to the polyol formulation (efflux time: 3 s). The mixture is subjected to intensive mixing for 5 seconds using a stirring means (Pendraulik). A stopwatch is started at commencement of the mixing and the characteristic reaction times are read-off therefrom. About 93 g of the reaction mixture are poured into a teflon film-lined aluminum box mold having a volume of 1.6 $dm^3$ and a temperature of 23° C. The mold is closed and bolted. After six minutes the mold is unbolted, decompressed and the mold pressure is qualitatively assessed via the height by which the mold lid has been raised by the molding [mm] The demolded foam cushion is qualitatively assessed for reaction completeness and for skin and pore structure. The reaction kinetics are determined using the residual reaction mixture in the beaker.

The cream time has been attained when a first foaming of the mixture is observable. This indicates the beginning of the reaction between isocyanate and water.

The fiber time has been attained when strings can be pulled from the surface of the rising foam by dabbing with a wooden spatula. Alternatively, lumps form on the wooden spatula.

The rise time has been attained when the foam finally ceases to expand. It should be noted here that some systems have a propensity to undergo some sagging before rising again.

Polyol Formulations

The additive base mixture comprises 12.0% by weight of glycerol, 20.5% by weight of the polyether-modified siloxane Tegostab® B8734 LF2 (OH number 83 mg KOH/g), 61.6% of water and 6.0% by weight of the blowing catalyst N-[2-dimethylamino)ethoxy]ethyl]-N-methyl-1,3-propanediamine.

Tegostab® is an Evonik brand.

| Prodn. exmpl. | PEx1 | PEx2 | PEx3 | PEx4 | PEx5 | PEx6 | PEx7 | PEx8 | PEx9 |
|---|---|---|---|---|---|---|---|---|---|
|  | Comp. | Comp. |  |  | Comp. | Comp. |  |  |  |
| A3 | 90.37 | 90.25 |  |  | 90.19 | 90.20 |  |  |  |
| A4 |  |  | 90.23 | 89.43 |  |  | 89.98 |  |  |
| A8 |  |  |  |  |  |  |  | 90.24 | 90.24 |
| Additive base mixture | 5.02 | 5.02 | 5.02 | 5.02 | 5.02 | 5.02 | 5.02 | 5.02 | 5.02 |
| A7 | 4.00 | 3.99 | 3.99 | 4.90 | 3.99 | 3.99 | 4.30 | 3.99 | 3.99 |
| Diethanolamine | 0.30 | 0.35 | 0.35 | 0.30 | 0.30 | 0.35 | 0.30 | 0.30 | 0.30 |
| Gel catalyst | 0.30 | 0.40 | 0.40 | 0.35 | 0.50 | 0.45 | 0.40 | 0.45 | 0.45 |
|  | 100.00 | 100.00 | 100.00 | 100.00 | 100.00 | 100.00 | 100.00 | 100.00 | 100.00 |
| POM content | 58.7 | 58.6 | 59.4 | 58.9 | 58.5 | 58.5 | 59.3 | 0 | 0 |

PEx = production example; all amounts in parts by weight, except POM content in g/kg; gel catalyst is a mixture of 95% by weight 6-dimethylamino-1-hexanol and 5% by weight of N-[2[2-dimethylamino)ethoxy]ethyl]-N-methyl-1,3-propanediamine Foams: Production

|  | CEx1 | CEx2 | Ex1 | CEx3 | CEx4 | Ex2 | Ex3 | Ex4 |
|---|---|---|---|---|---|---|---|---|
| Index | 90 | 90 | 90 | 70 | 70 | 70 | 70 | 90 |
| Polyol formulation | PEx1 | PEx2 | PEx4 | PEx5 | PEx6 | PEx7 | PEx8 | PEx9 |
| Isocyanate | CPp2 | CPp2 | Pp1 | CPp2 | CPp2 | Pp1 | Pp1 | Pp1 |
| Grams of isocyanate per 100 g of | 66.3 | 66.5 | 65.6 | 51.6 | 51.8 | 50.8 | 49.9 | 64.1 |

-continued

| Index | CEx1 90 | CEx2 90 | Ex1 90 | CEx3 70 | CEx4 70 | Ex2 70 | Ex3 70 | Ex4 90 |
|---|---|---|---|---|---|---|---|---|
| polyol formulation (parts by wt.) | | | | | | | | |
| POM content in system (g/kg) | 46.4 | 46.3 | 44.1 | 48.1 | 48.1 | 46.5 | 7.2 | 8.4 |
| Cream time | 12 | 13 | 12 | 12 | 12 | 10 | 10 | |
| Fiber time | 85 | 73 | 75 | 67 | 78 | 76 | 78 | 78 |
| Rise time | | 95 | 115 | 100 | 100 | 105 | 90 | 78 |
| Comment | Undergoes sagging | | | No lid raising | | | | |
| Cell structure | | fine | intermediate | | fine-intermediate | intermediate | intermediate | intermediate |
| Skin | | good | ok | | good | ok | good | good |

CEx = comparative example

Foams: Mechanical Properties

| Index | | CEx2 90 | Ex1 90 | Ex4 90 | CEx4 70 | Ex5 70 | Ex3 70 |
|---|---|---|---|---|---|---|---|
| | | Comparative | | | Comparative | | |
| Apparent density DIN EN ISO 845 (2009) | kg/m³ | 58.6 | 46.1 | 55.4 | 54.6 | 47.3 | 57.6 |
| Compression test DIN EN ISO 3386-1 (October 2015) | | | | | | | |
| Force at 40% compression ("CV40") | kPa | 10 | 11 | 8 | 9 | 3 | 4 |
| Damping | | 0.34 | 0.35 | 0.29 | 0.27 | 0.32 | 0.23 |
| Compression set according to DIN EN ISO 1856-2008 22 hours at 70° C. and 75% compression | | 21% | 20% | | 55% | 15% | |
| Air permeability according to ASTM D 3574 (2017) at 125 Pa differential pressure | dm³/s | 0.25 | 0.14 | 0.14 | 0.40 | 0.22 | 0.34 |

It is apparent that the inventive foam based on the POM-containing polyether A2 has a more advantageous apparent density and, at an index of 70, compression set.

Results of emissions test according to thermodesorption method DIN EN ISO/IEC 17025:2011-10 ("VDA278")

VOC: 90° C., retention time window up to n-pentacosane (C25): 48.40 min

Index 70 foams, amounts in mg/kg toluene equivalent

| Polyol | Isocyanate | | A | B | C | D | E | F | Total |
|---|---|---|---|---|---|---|---|---|---|
| PEx5 | CPp 2 | Comparative | 18 | 1 | 4 | 1 | | 5 | 29 |
| PEx7 | Pp1 | | 6 | | 5 | | | 8 | 19 |

VOC evaluation according to mass library: A represents dipropylene glycol and oligomers of propylene glycol; B represents methyldioxolane, C represents cyclic propylene carbonate, D represents tetradecane, E represents dimethylaminocyclohexanol, F represents other volatile organic compounds.

It is apparent that foams based on polyether A2 exhibit markedly better emissions.

Foams produced with index of 90, amounts in mg/kg toluene equivalent

| Polyol | Isocyanate | | A | B | C | F | Total |
|---|---|---|---|---|---|---|---|
| PEx1 | CPp 2 | Comparative | 1 | 4 | 6 | | 11 |
| PEx3 | Pp1 | | | | | 8 | 8 |

Evaluation according to mass library: A represents dipropylene glycol and oligomers of propylene glycol; B represents methyldioxolane, C represents cyclic propylene carbonate, F represents other volatile organic compounds.

It is apparent that foams produced with a higher index exhibit markedly better emissions. It is apparent that foams based on polyether A2 exhibit markedly better emissions.

FOG: 120° C., retention time window tetradecane (C14): 11 min-dotricontane (C32) 41.65 min Foams produced with index of 90, amounts in mg/kg hexadecane equivalent

| Polyol | Isocyanate | | A | G | F | Total |
|---|---|---|---|---|---|---|
| PEx1 | CPp2 | Comparative | | | 6 | 6 |
| PEx3 | Pp1 | | | | 2 | 2 |

Evaluation according to mass library: A represents dipropylene glycol and oligomers of propylene glycol; B represents methyldioxolane, C represents cyclic propylene carbonate, F represents other volatile organic compounds.

It is apparent that foams produced with a higher index exhibit markedly better emissions. It is apparent that foams based on polyether A2 exhibit markedly better emissions.

Foams produced with index of 70, amounts in mg/kg hexadecane equivalent

| Polyol | Isocyanate | | A | G | F | Total |
|---|---|---|---|---|---|---|
| PEx5 | CPp2 | Comparative | 38 | 2 | 2 | 42 |
| PEx7 | Pp1 | | 23 | 1 | 1 | 25 |

Evaluation according to mass library: A represents dipropylene glycol and oligomers of propylene glycol; F represents other volatile organic compounds and G is acridine. It is apparent that foams based on polyether A2 exhibit markedly better emissions.

Emissions Test for Aldehydes (Modified Bottle Method)

Charged into a glass bottle of one liter in volume are 25 milliliters of water and 25 millilitres of a solution of 0.3 mmol/liter of dinitrophenylhydrazine (DNPH) in 3 mM phosphoric acid-acidified acetonitrile. The content of DNPH is 7.5 μmol per bottle. A foam sheet having dimensions of 40*10*4 cm³ is secured freely suspended from the lid so that the foam is not in contact with the aqueous solution at the bottom of the bottle. The bottle is closed and stored in a recirculating air drying cabinet at 65° C. for 3 hours. The bottle is allowed to cool to room temperature, the foam is withdrawn and the composition of the aqueous solution is analyzed by LC-MS/MS for the hydrazones of the aldehydes recited below. For each foam quality three bottles are analyzed. For each test run a further three bottles without foam are coanalyzed. The average reference value is subtracted from the measured values. The emissions of the respective aldehydes per kilogram of foam are extrapolated on this basis. This is reported in mg of aldehyde per kg of foam.

Foams produced with index of 90, amounts in mg/kg hexadecane equivalent

| Polyol | Isocyanate | | Formaldehyde | | Acetaldehyde | |
|---|---|---|---|---|---|---|
| | | | mg/kg | micromoles/kg | mg/kg | micromoles/kg |
| PEx1 | CPp2 | Comparative | 7.4 | 247 | 1.2 | 27 |
| PEx3 | Pp1 | | 9.5 | 318 | 0.7 | 15 |
| PEx9 | Pp1 | | 1.4 | 47 | <0.3 | <7 |

It is apparent that foams based on the polyether A2 exhibit somewhat worse emissions of formaldehyde and markedly better emissions for acetaldehyde.

Foams produced with index of 70, amounts in mg/kg hexadecane equivalent

| Polyol | Isocyanate | | Formaldehyde | | Acetaldehyde | |
|---|---|---|---|---|---|---|
| | | | mg/kg | micromoles/kg | mg/kg | micromoles/kg |
| PEx5 | CPp2 | Comparative | 11.5 | 384 | | 33 |
| PEx7 | Pp1 | | 15.2 | 473 | | 15 |
| PEx8 | Pp1 | | 1.4 | 47 | <0.3 | <7 |

It is apparent that foams based on the polyether A2 exhibit somewhat worse emissions of formaldehyde and markedly better emissions for acetaldehyde. Flame spread according to method FMVSS302 without supporting wires

| Polyol | Isocyanate | | Index 70 | Index 90 | mean | |
|---|---|---|---|---|---|---|
| PEx5 | CPp2 | Comparative | 1.37 | 1.05 | 1.21 | mm/s |
| PEx7 | Pp1 | | 1.11 | 1.18 | 1.15 | mm/s |

Comparison of the two polyethers A1 and A2 which each contain POM blocks shows that on average the polyether having the lower OH number achieves the slightly better result. The requirements of guideline 95/28/EC in respect of horizontal burn rate are met by all types. The requirements of standard FMVSS 302 were met by all foams except comparative example CPp2/index 70.

Content of Methylenebisdiphenylamine (MDA)

Determination was carried out according to the so-called "Skarping" extraction method according to Certipur® with 0.1 molar acetic acid. Foam from the edge region of the shaped body was cut into 0.5 g pieces. These pieces were filled into a plastic syringe. 3 cm$^3$ of 0.1 molar acetic acid were filled into the syringe. The syringe plunger was replaced and the contents of the syringe were compressed. The liquid was collected in a glass vessel. This liquid was completely drawn up and expelled again. A total of 20 extraction cycles were performed. The solution treated with acetic acid is finally filtered and analyzed for aromatic amines by HPLC-UV. Amounts are reported in milligrams per kilogram of foam weighed out.

| Polyol | Isocyanate | | Index 70 2,4'-MDA mg/kg | Index 70 4,4'-MDA mg/kg | Index 90 2,4'-MDA mg/kg | Index 90 4,4'-MDA mg/kg | mean 2,4'-MDA + 4,4'MDA mg/kg |
|---|---|---|---|---|---|---|---|
| PEx5 | CPp2 | Comparative | 0.4 | 2.8 | 0.2 | 2.0 | 2.7 |
| PEx7 | Pp1 | | 0.3 | 1.8 | 0.3 | 1.2 | 1.8 |
| | | | −25% | −36% | +50% | −40% | −33% |
| PEx8 | Pp1 | | <0.2 | 0.6 | 0.2 | 0.4 | <0.7 |

It is apparent that foams based on the polyether A2 have on average lower contents of aromatic amines than those based on polyol A1.

The invention claimed is:

1. A process for producing flexible polyurethane foams by reacting a component A comprising
    A1 at least one polyoxymethylene-polyoxyalkylene block copolymer comprising two polyoxyalkylene blocks and having a hydroxyl number according to DIN EN ISO 4629-1:2016-12 of 38 mg KOH/g to 56 mg KOH/g, wherein the two polyoxyalkylene blocks are terminal and the at least one polyoxymethylene-polyoxyalkylene block copolymer is present in an amount of 5 to 85 parts by weight;
    optionally A2 at least one compound having 2 to 6 Zerewitinoff-active H atoms and which is selected from the group of polyether polyols, polyester polyols, polyether ester polyols, polycarbonate polyols, polyacrylate polyols, or mixtures of any two or more thereof, wherein the at least one compound having 2 to 6 Zerewitinoff-active H atoms is present in an amount of 0 to 95 parts by weight;
    A3 water and/or physical blowing agents, wherein the water and/or physical blowing agents are present in an amount of 0.1 to 25 parts by weight based on the sum of the parts by weight of A1 and A2;
    optionally A4 at least one compound which has at least 2 Zerewitinoff-active H atoms and is distinct from A2, wherein the at least one compound which has at least 2 Zerewitinoff-active H atoms and is distinct from A2 is present in an amount of 0 to 10 parts by weight based on the sum of the parts by weight of A1 and A2; and
    optionally A5 auxiliary and additive substances, wherein the auxiliary and additive substances are present in an amount of 0 to 10 parts by weight based on the sum of the parts by weight of A1 and A2;
    with a component B comprising
    B1 at least one di- and/or polyisocyanate having an average NCO functionality of 2.0 to 2.6;
    wherein the reaction of the component A with the component B is performed in the presence of a catalyst and at an isocyanate index of 50 to 130, and wherein all reported parts by weight of the components A1 to A5 are normalized such that the parts by weight of A1+A2 in the composition sum to 100 parts by weight.

2. A process for producing flexible polyurethane foams by reacting a component A comprising
    A11 of at least one polyoxymethylene-polyoxyalkylene block copolymer comprising two polyoxyalkylene blocks and having a hydroxyl number according to DIN EN ISO 4629-1:2016-12 of 5 mg KOH/g to 56 mg KOH/g wherein the two polyoxyalkylene blocks are terminal and the at least one polyoxymethylene-polyoxyalkylene block copolymer is present in an amount of 0 to 85 parts by weight;
    and/or A12 at least one compound having 2 to 6 Zerewitinoff-active H atoms and which is selected from the group of polyether polyols, polyester polyols, polyether ester polyols, polycarbonate polyols polyacrylate polyols, or mixtures of any two or more thereof, wherein the at least one compound having 2 to 6 Zerewitinoff-active H atoms is present in an amount of 0 to 100 parts by weight;
    A13 water and/or physical blowing agents, wherein the water and/or physical blowing agents are present in an amount of 0.1 to 25 parts by weight based on a sum of the parts by weight of the components A11 and A12;
    optionally A14 at least one compound which has at least 2 Zerewitinoff-active H atoms and is distinct from A12, wherein the at least one compound which has at least 2 Zerewitinoff-active H atoms and is distinct from A12 is present in an amount of 0 to 10 parts by weight based on the sum of the parts by weight of A11 and A12; and
    optionally A15 auxiliary and additive substances, wherein the auxiliary and additive substances are present in an amount of 0 to 10 parts by weight based on the sum of the parts by weight of A11 and A12;
    with a component B comprising
    B2 at least one prepolymer having an NCO content of 18% to 40% by weight of NCO and obtained by reaction of
    A1 at least one polyoxymethylene-polyoxyalkylene block copolymer comprising two polyoxyalkylene blocks and having a hydroxyl number according to DIN EN ISO 4629-1:2016-12 of 38 mg KOH/g to 56 mg KOH/g, wherein the two polyoxyalkylene blocks are terminal;
    optionally A2 optionally further isocyanate-reactive or inert components containing no polyoxymethylene;
    with
    B1 at least one di- and/or polyisocyanate having an average NCO functionality of 2.0 to 2.6, optionally in the presence of a catalyst;
    wherein the reaction of the component A with the component B is performed in the presence of a catalyst and at an isocyanate index of 50 to 130, and wherein all reported parts by weight of the components A11 to A15 are normalized such that the parts by weight of A11+ A12 in the composition sum to 100 parts by weight.

3. The process as claimed in claim 1, wherein the at least one polyoxymethylene-polyoxyalkylene block copolymer A1 comprises a polyoxymethylene block having a weight-average molecular weight of 62 to 30000 g/mol measured by gel permeation chromatography using polystyrene standards.

4. The process as claimed in claim 1, wherein the at least one polyoxymethylene-polyoxyalkylene block copolymer A1 has the following formula (I):

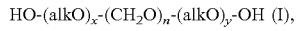

wherein
each alkO is the same or different and is a structural unit derived from ethylene oxide, propylene oxide, butylene oxide, or styrene oxide;
x is 2 to 100;
y is 2 to 100; and
n=5 to 100.

5. The process as claimed in claim 1, wherein A2 is a polypropylene oxide-polyethylene oxide block copolymer having an average functionality between 2.7 and 6, a hydroxyl number according to DIN EN ISO 4629-1:2016-12 of 26 mg KOH/g to 56 mg KOH/g, and a ratio of propylene oxide to ethylene oxide of 0.1:1 to 9:1.

6. The process as claimed in claim 1, wherein the catalyst is a catalyst which reacts with the at least one di- and/or polyisocyanate to provide urethane, urea, allophanate, or biuret groups.

7. A flexible polyurethane foam obtained by the process as claimed in claim 1.

8. The flexible polyurethane foam as claimed in claim 7, wherein the flexible polyurethane foam has an apparent density of 0.02 to 0.8 kg/dm³, measured according to DIN ISO 845:2009-10.

9. The flexible polyurethane foam according to claim 8, wherein the flexible polyurethane foam meets horizontal burning rate requirements based on guideline 95/28/EC and standard FMVSS 302.

10. A two-component system for producing flexible polyurethane foams from a component A comprising
A1 at least one polyoxymethylene-polyoxyalkylene block copolymer comprising two polyoxyalkylene blocks and having a hydroxyl number according to DIN EN ISO 4629-1:2016-12 of 38 mg KOH/g to 56 mg KOH/g, wherein the two polyoxyalkylene blocks are terminal and the at least one polyoxymethylene-polyoxyalkylene block copolymer is present in an amount of 5 to 85 parts by weight;
optionally A2 at least one compound having 2 to 6 Zerewitinoff-active H atoms and which is selected from the group of polyether polyols, polyester polyols, polyether ester polyols, polycarbonate polyols, polyacrylate polyols, or mixtures of any two or more thereof, wherein the at least one compound having 2 to 6 Zerewitinoff-active H atoms is present in an amount of 0 to 95 parts by weight;
A3 water and/or physical blowing agents, wherein the water and/or physical blowing agents are present in an amount of 0.1 to 25 parts by weight based on the sum of the parts by weight of A1 and A2;
optionally A4 at least one compound which has at least 2 Zerewitinoff-active H atoms and is distinct from A2, wherein the at least one compound which has at least 2 Zerewitinoff-active H atoms and is distinct from A2 is present in an amount of 0 to 10 parts by weight based on the sum of the parts by weight of A1 and A2;
optionally A5 auxiliary and additive substances, wherein the auxiliary and additive substances are present in an amount of 0 to 10 parts by weight based on the sum of the parts by weight of A1 and A2;
and a component B comprising
B1 at least one di- and/or polyisocyanate having an average NCO functionality of 2.0 to 2.6;
and at least one catalyst, wherein the component A and the component B are present in a ratio of an isocyanate index of 50 to 130, and wherein all reported parts by weight of the components A1 to A5 are normalized such that the parts by weight of A1+A2 in the composition sum to 100 parts by weight.

11. A two-component system for producing flexible polyurethane foams from a component A comprising
A11 at least one polyoxymethylene-polyoxyalkylene block copolymer comprising two polyoxyalkylene blocks and having a hydroxyl number according to DIN EN ISO 4629-1:2016-12 of 5 mg KOH/g to 56 mg KOH/g, wherein the two polyoxyalkylene blocks are terminal and the at least one polyoxymethylene-polyoxyalkylene block copolymer is present in an amount of 0 to 85 parts by weight;
and/or A12 at least one compound having 2 to 6 Zerewitinoff-active H atoms and which is selected from the group of polyether polyols, polyester polyols, polyether ester polyols, polycarbonate polyols, polyacrylate polyols, or mixtures of any two or more thereof, wherein the at least one compound having 2 to 6 Zerewitinoff-active H atoms is present in an amount of 0 to 100 parts by weight;
A13 water and/or physical blowing agents, wherein the water and/or physical blowing agents are present in an amount of 0.1 to 25 parts by weight based on the sum of the parts by weight of A11 and A12;
optionally A14 at least one compound which has at least 2 Zerewitinoff-active H atoms and is distinct from A12, wherein the at least one compound which has at least 2 Zerewitinoff-active H atoms and is distinct from A12 is present in an amount of 0 to 10 parts by weight based on the sum of the parts by weight of A11 and A12;
optionally A15 auxiliary and additive substances, wherein the auxiliary and/or additive substances are present in an amount of 0 to 10 parts by weight based on the sum of the parts by weight of A11 and A12;
with a component B comprising
B2 at least one prepolymer having an NCO content of 18-40% by weight of NCO and obtained by reaction of A1 to at least one polyoxymethylene-polyoxyalkylene block copolymer two polyoxyalkylene blocks and having a hydroxyl number according to DIN EN ISO 4629-1:2016-12 of 38 mg KOH/g to 56 mg KOH/g, wherein the two polyoxyalkylene blocks are terminal and the at least one polyoxymethylene-polyoxyalkylene block copolymer is present in an amount of 5 to 18 parts by weight based on the total weight of B2;
optionally A2 further isocyanate-reactive or inert components containing no polyoxymethylene;
B1 at least one di- and/or polyisocyanate having an average NCO functionality of at least 2.0 to 2.6, optionally in the presence of a catalyst;
and at least one catalyst, wherein the component A and the component B are present in a ratio of an isocyanate index of 50 to 130 and wherein all reported parts by weight of the components A11 to A15 are normalized such that the parts by weight of A11+A12 in the composition sum to 100 parts by weight.

12. The process as claimed in claim 2, wherein the at least one polyoxymethylene-polyoxyalkylene block copolymer A11 comprises a polyoxymethylene block having a weight-average molecular weight of 62 to 30000 g/mol measured by gel permeation chromatography using polystyrene standards.

13. The process as claimed in claim 2, wherein the at least one polyoxymethylene-polyoxyalkylene block copolymer A11 has the following formula (I):

HO-(alkO)$_x$-(CH$_2$O)$_n$-(alkO)$_y$-OH (I), wherein
each alkO is the same or different and is a structural unit derived from ethylene oxide, propylene oxide, butylene oxide, or styrene oxide;
x is 2 to 100;
y is 2 to 100; and
n=5 to 100.

14. The process as claimed in claim 2, wherein A12 is a polypropylene oxide-polyethylene oxide block copolymer having an average functionality between 2.7 and 6, a hydroxyl number according to DIN EN ISO 4629-1:2016-12 of 26 mg KOH/g to 56 mg KOH/g, and a ratio of propylene oxide to ethylene oxide of 0.1:1 to 9:1.

15. The process as claimed in claim 2, wherein the catalyst is a catalyst which reacts with the at least one di- and/or polyisocyanate B1 to provide urethane, urea, allophanate, or biuret groups.

16. The process as claimed in claim 1, wherein the at least one polyoxymethylene-polyoxyalkylene block copolymer A1 has a hydroxyl number according to DIN EN ISO 4629-1:2016-12 of 41 mg KOH/g to 56 mg KOH/g.

17. The process as claimed in claim 2, wherein the at least one polyoxymethylene-polyoxyalkylene block copolymer A1 has a hydroxyl number according to DIN EN ISO 4629-1:2016-12 of 41 mg KOH/g to 56 mg KOH/g.

18. The two-component system of claim 10, wherein the at least one polyoxymethylene-polyoxyalkylene block copolymer A1 has a hydroxyl number according to DIN EN ISO 4629-1:2016-12 of 41 mg KOH/g to 56 mg KOH/g.

19. The two-component system of claim 11, wherein the at least one polyoxymethylene-polyoxyalkylene block copolymer A1 has a hydroxyl number according to DIN EN ISO 4629-1:2016-12 of 41 mg KOH/g to 56 mg KOH/g.

* * * * *